United States Patent [19]
De Feo

[11] 3,860,359
[45] Jan. 14, 1975

[54] MOUNTING SYSTEM FOR GAS TURBINE POWER UNIT

[75] Inventor: Angelo De Feo, Passaic, N.J.

[73] Assignee: Curtiss-Wright Corporation, Wood-Ridge, N.J.

[22] Filed: July 30, 1973

[21] Appl. No.: 384,007

[52] U.S. Cl. ............... 415/209, 60/39.31, 60/39.32
[51] Int. Cl. .............................................. F01d 1/02
[58] Field of Search ......... 60/39.31, 39.32, 39.16 R, 60/39.16 C, 39.17; 415/60, 68, 209, 134, 138, 126, 128; 416/171, 124; 417/407, 423, 360; 248/DIG. 1, 54 R, 15

[56] References Cited
UNITED STATES PATENTS

| | | | |
|---|---|---|---|
| 2,585,576 | 2/1952 | Nicolin et al. | 60/39.31 |
| 2,763,462 | 9/1956 | McDowall et al. | 60/39.32 |
| 3,366,365 | 1/1968 | Rizk | 415/138 |
| 3,586,459 | 6/1971 | Zerlauth | 415/60 |

FOREIGN PATENTS OR APPLICATIONS

| | | | |
|---|---|---|---|
| 1,157,062 | 5/1958 | France | 60/39.31 |

Primary Examiner—William L. Freeh
Assistant Examiner—O. T. Sessions
Attorney, Agent, or Firm—Victor D. Behn

[57] ABSTRACT

A mounting system for a gas turbine power unit in which the stator housing is supported by an annular mounting ring having a radial spline connection to the stator housing, the mounting ring and turbine rotor being supported from a common base structure whereby the rotor and stator housing remain coaxial notwithstanding thermal expansions and contractions of the stator housing and/or rotor.

4 Claims, 6 Drawing Figures

MOUNTING SYSTEM FOR GAS TURBINE POWER UNIT

BACKGROUND OF THE INVENTION

The invention relates to a gas turbine power unit, particularly large gas turbine power units, such as are employed for driving large electrical generators at public utility electric generating plants.

For efficient operation the gas turbine must operate with only small radial clearance between the blades of the turbine rotor and the stator housing surrounding the rotor. For this reason it is imperative that the concentricity be maintained between the turbine rotor and stator housing notwithstanding changes in temperatures of various components of the turbine rotor and/or stator housing. This is particularly difficult in large gas turbine power units where because of their size relatively large thermal expansions and contractions occur between the condition of the power unit when it is shut down and when it is operating.

SUMMARY

In accordance with the present invention both the rotor and stator housing of the gas turbine power unit are separately supported from a common base structure. The stator housing is supported by an annular mounting ring surrounding the stator housing and connected to the housing through inter-fitted radial splines so as to maintain the concentricity of the stator housing and mounting ring notwithstanding relative thermal expansion and contraction of the said housing and ring. The annular mounting ring and the turbine rotor are both supported from a common base structure whereby the concentricity of the rotor and stator housing are maintained.

It is therefore an object of the invention to provide an improved mounting system for large gas turbine power units.

More specifically, the annular mounting ring is connected to the stator housing at the stator vane assembly whereby inlet and exhaust ducts of the stator housing can expand axially in opposite directions from the mounting ring connection without materially changing the axial clearance between the stator vanes and rotor blades. Hence, with the present invention both the axial clearance and radial clearance of the rotor blades are maintained notwithstanding thermal expansions and contractions of the rotor and/or stator housing.

In the large turbine power unit contemplated by the invention, the exhaust duct becomes quite large and heavy and includes an annular exhaust volute at its aft end. In order to minimize the imposition of bending stresses at the connection of the exhaust duct to the mounting ring, the exhaust duct is separately supported from said common base structure by springs in such a way that only shear loads are applied on the connection of the stator housing to the mounting ring. Specifically, the exhaust duct is supported by a pair of compression springs at its aft end disposed on opposite sides of the axis of the power unit, with the axis of each spring being inclined from the vertical when the power unit is shut down in such a direction that when the power unit thermally expands as a result of operation, the axis of each of said springs is moved to a vertical position for proper support of the exhaust duct. In addition, the turbine rotor is supported by a bearing pedestal from said common base structure with the bearing pedestal having a cantilevered portion extending in an upstream direction through the hollow interior of the annular exhaust duct.

Accordingly, a further object of the invention comprises the provision that the mounting system for a gas turbine power unit in which the stator housing is supported from an annular mounting ring through inter-fitting radial splines and the exhaust duct is resiliently supported by springs to minimize bending stresses at the connection of the exhaust duct to the mounting ring and the turbine rotor is supported by a bearing pedestal, both said bearing pedestal and mounting ring being supported by a common base structure.

Other objects and advantages of the invention will become apparent upon reading the following specification in connection with the accompanying drawings.

BRIEF DESCRIPTION OF THE DRAWINGS

In FIG. 1, the gas turbine power unit is indicated generally by reference numeral 10. This power unit comprises a stator housing having an inlet duct 12 with a flexible bellows 14 at its upstream end for connection to the discharge duct 16 of a suitable generator of combustion gasses indicated generally by reference numeral 18. The bellows 14 provides a flexible connection between the gas turbine unit 10 and the combustion gas generator 18 so that each may be independently supported.

Figure 1:
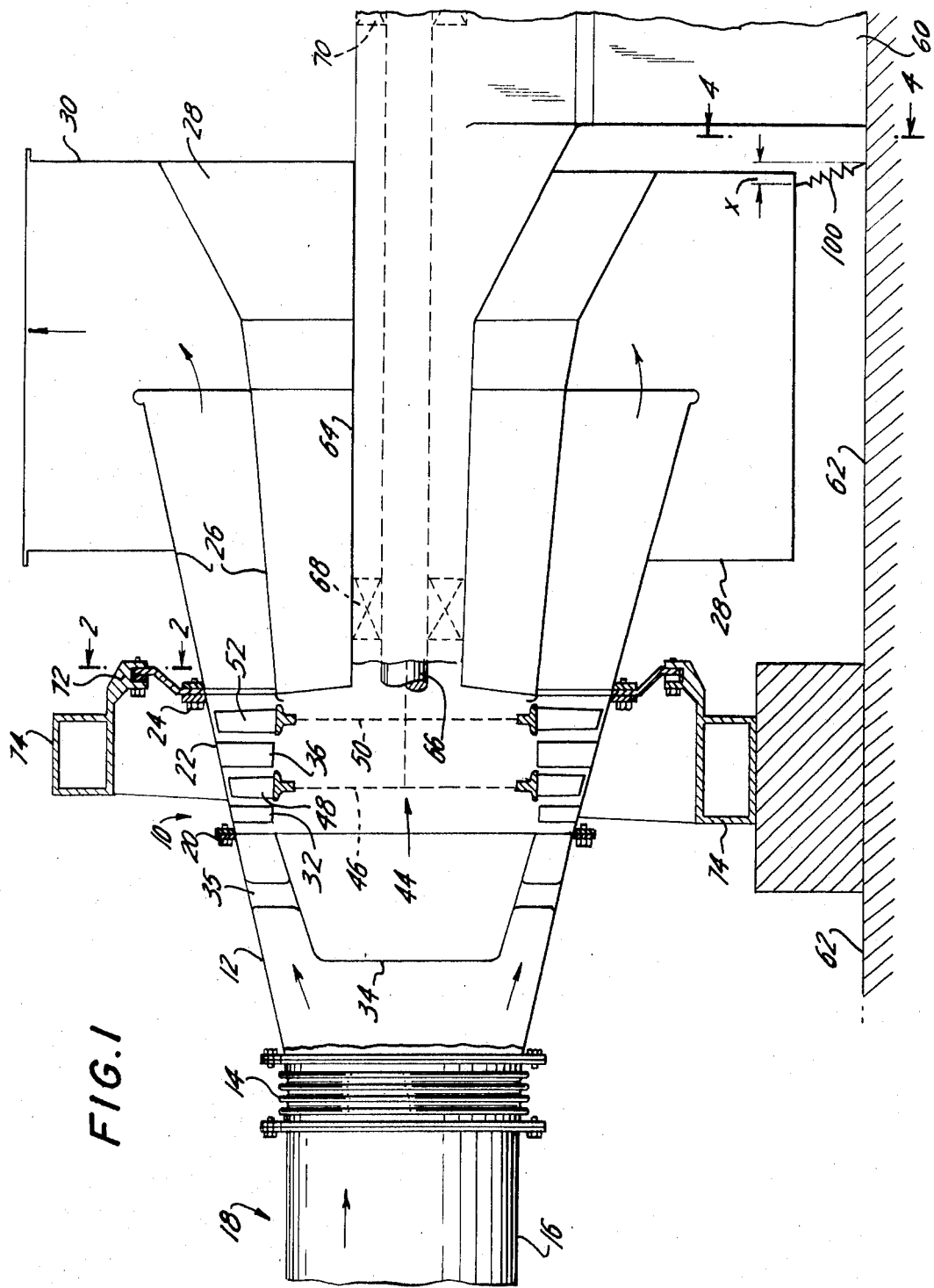
FIG. 1 is a schematic axial sectional view of a gas turbine power unit embodying the invention.

Details of such a combustion gas generator 18 are conventional and form no part of the present invention and, for example, may comprise the usual air compressor, combustor unit, and turbine rotor driven by the combustion gasses and drivably connected to the compressor, the combustion gasses discharging from the rotor of said gas generator through the discharge duct 16 of said generator and thence into the inlet duct 12 of the power unit.

The downstream end of the inlet duct 12 is connected at 20 to a stator vane assembly 22 and the downstream end of the stator vane assembly is connected at 24 to an annular exhaust duct 26. The downstream end of the exhaust duct 26 extends into and is connected, for example, by welding to an annular exhaust volute 28 having an upwardly extending chimney portion 30. The inlet duct 12, stator vane assembly 22 and the exhaust duct 26 with its exhaust volute 28 and chimney 30 thereby constitute the stator housing of the gas turbine power unit 10.

The upstream end of the stator vane assembly 22 includes a plurality of circumferentially-shaped, first-stage stator vanes 32 extending radially across the flow path of the combustion gasses. The inner wall of this annular path is formed by a nose piece 34 extending upstream from the first-stage stator vanes 32 and supported by suitable struts such as indicated at 35 so as to form part of the inlet duct 12. In addition, as illustrated, the stator vane assembly 22 includes a plurality of circumferentially-shaped, second-stage stator vanes 36 disposed downstream of the first-stage stator vanes 32.

A turbine rotor assembly 44 is axially supported within and independently of the stator vane assembly 22. As illustrated, the turbine rotor assembly 44 is a two-stage rotor having a first-stage rotor disk 46 with a plurality of circumferentially-shaped, first-stage rotor blades 48 extending radially therefrom between the first and second-stage stator vanes 32 and 36. In addition the turbine rotor assembly 44 is illustrated as including a second-stage rotor disk 50 having a plurality of circumferentially-spaced, second-stage rotor blades 52 extending radially therefrom downstream of the second-stage stator vanes 36. The precise number of stages of stator vanes and rotor blades form no part of the present invention. The structure of the gas turbine power unit so far described is conventional.

The turbine rotor assembly 44 is supported by a bearing pedestal 60 mounted on a support base 62. The bearing pedestal has a forwardly directed canterlivered portion 64 within which the shaft 66 of the turbine rotor 44 is journaled by means of bearings 68 and 70. This cantilevered portion 64 of the bearing pedestal extends forwardly through the exhaust volute 28 and into the hollow interior of the annular exhaust duct 26 to a point adjacent the downstream rotor disk 50. In this way the bearing pedestal provides a rugged bearing support for the turbine rotor assembly 44.

In order to support the turbine stator housing, the stator vane assembly 22 is provided with a conical annular mounting diaphragm or flange 70. As illustrated, this conical flange 70 is secured at its inner end to the stator vane assembly 22 at its rear connecting flange 24 and for this purpose has a tight fit with the inside of an axial extension 71 of the flange 24. At its outer end the mounting flange 70 is engaged with a supporting flange 72 secured to an annular mounting ring 74 disposed about the stator vane assembly 22. The mounting ring 74 is supported at its lower end on the common base structure 62. As hereinafter explained, both the mounting ring 74 and the stator vane assembly 22 have a split construction.

Figure 2:
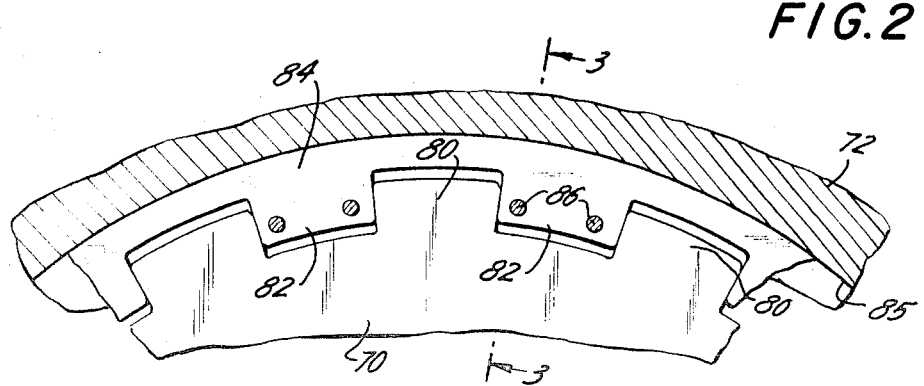
FIG. 2 is a view of the inter-fitting radial splines between the mounting ring and stator housing mounting flange, this view generally being taken along line 2—2 of FIG. 1 and more specifically along line 2—2 of FIG. 3.
Figure 3:
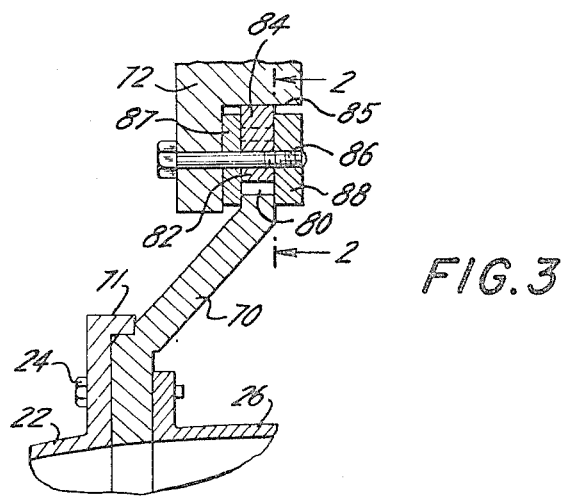
FIG. 3 is a sectional view taken along line 3—3 of FIG. 2, FIGS. 2 and 3 being enlarged views.

As best seen in FIGS. 2 and 3, the conical mounting flange 70 has outwardly facing splines 80 at its outer diameter which are inter-fitted with inwardly facing splines 82 on a ring 84 having a tight fit within an annular shoulder 85 on the mounting ring flange 72 and held in place by screws 86 whereby the ring 84 is rigidly secured to said flange. The engaging sides of said splines 80 and 82 are radial in order that the fit between these radial sides does not change with change in temperature. A suitable shim 87 may be provided between the flange 72 and ring 84 for accurately locating the stator vane assembly 22 in an axial direction. An annular ring 88 is secured to the mounting flange 72 by the screws 86 so as to prevent relative axial displacement of the splines 80 and 82 out from meshing engagement.

The stator vane assembly 22 is thus supported by the mounting ring 74 through the engaging sides of the meshing splines 80 and 82. This spline engagement thereby locates the axis of the stator vane assembly relative to the mounting ring 74. Since the mounting ring 74 and the turbine rotor bearing pedestal 60 are mounted on a common support base 62, the axes of the stator vane assembly 22 and the turbine rotor assembly 44 are accurately located relative to each other. By suitably positioning the rotor bearing pedestal 60 and the mounting ring 74 on the common support base 62, the axis of the turbine rotor 44 and the axis of the stator vane assembly 22 can be made to coincide. For this purpose the support for the mounting ring 74 on the base 62 has provision (not shown) for vertical shimming and lateral adjustment.

Figure 6:
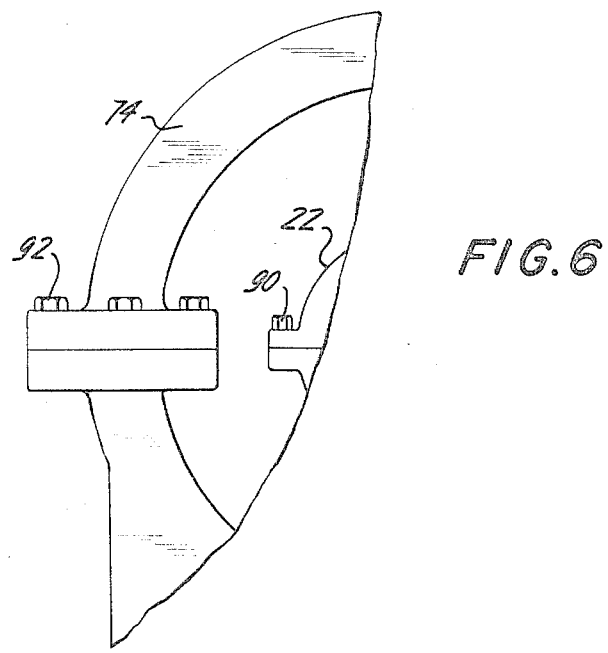
FIG. 6 is a fragmentary end view showing a split construction of the stator vane assembly and of the mounting ring.

Because the engaging sides of the splines 80 and 82 are radial, the fit between these splines is maintained notwithstanding changes in temperature which result in thermal expansion or contraction of the members on which these splines are formed. Accordingly, once the mounting ring 74 and bearing pedestal 60 have been supported on the common support base 62 so that the axis of the turbine rotor assembly 44 and the axis of the turbine stator vane assembly 22 coincide, this coincidence will be maintained notwithstanding thermal expansions or contractions, for example, as between when the power unit is operating and when the power unit is shut down. This feature obviously is quite important in order that the turbine rotor blades 48 and 52 can operate with the small radial and axial clearance with the stator vane assembly 22. For ready disassembly and maintenance of the gas turbine power unit 10, both the stator vane assembly 22 and the mounting ring 74 with its flange 72 preferably are each split and connected together on a horizontal plane through the axis of the turbine power unit 10, for example, by screws 90 and 92 respectively as illustrated in FIG. 6. In this way the upper half of the stator vane assembly 22 can readily be moved for repair and maintenance. The conical mounting flange 70 and its intermeshing ring 84 both have a one-piece construction.

By attaching the conical mounting flange 70 to the stator vane assembly 22, the entire turbine stator housing is supported from this flange whereby the inlet duct 12 and the exhaust duct 26 are cantilevered in opposite directions from this mounting flange 70 and, therefore, are free to expand and contract axially with temperature changes. Also by supporting the turbine stator housing from the stator vane assembly, there is very little axial shift of the stator blades 32 and 36 as a result of temperature changes and therefore once the mounting ring 74 and bearing pedestal 60 have been properly positioned on the common support base 62 to provide the proper axial clearance between the stator vanes 32 and 36 and the rotor blades 48 and 52, this clearance will be maintained notwithstanding temperature changes.

The stator vane assembly mounting flange 70 preferably is connected as illustrated to the aft end of the stator vane assembly 22 because the exhaust duct with its exhaust volute 28 and chimney 30 is very much heavier than the inlet duct 12. For example, in an actual installation the discharge or exit end of the exhaust duct has a cross-section of about 7½ ft. by 6 ft. Also the weight of the exhaust duct is augmented by the fact that insulation is supported on and around the entire exhaust duct in order that the stator mounting ring 74 and turbine pedestal operates substantially at ambient temperature.

In order to minimize bending stresses at the connection of the exhaust duct with the mounting flange 70, which otherwise would result because of the weight of this duct, the aft end of the duct is supported by a pair of compression springs 100. The springs 100 are symmetrically disposed on opposite sides of the power unit axis.

Figure 4:
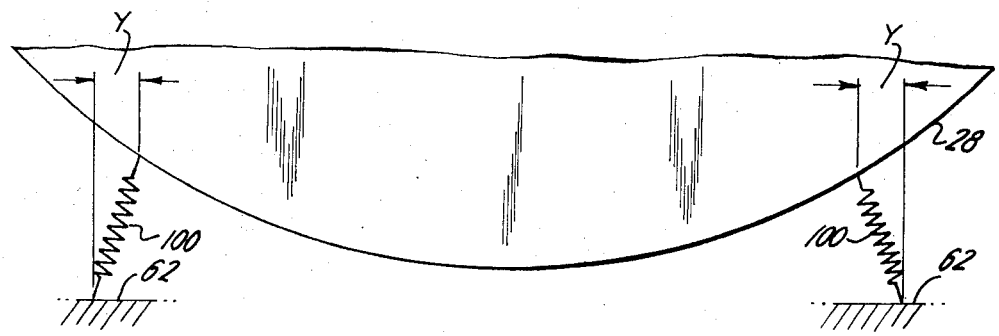
FIG. 4 is a view taken along line 4—4 of FIG. 1.

As best seen in FIGS. 1 and 4, when the power unit is shut down and cold, the axis of each spring 100 is inclined to the vertical such that the upper end of said spring axis is displaced forwardly a distance $x$ from its lower end (see FIG. 1) and its upper end is also displaced inwardly a distance $y$ from its lower end (see FIG. 4), $x$ and $y$ being exaggerated in said views.

The distances $x$ and $y$ are selected so that when the exhaust duct thermally expands as a result of power unit operation the axis of each spring becomes vertical.

Figure 5:
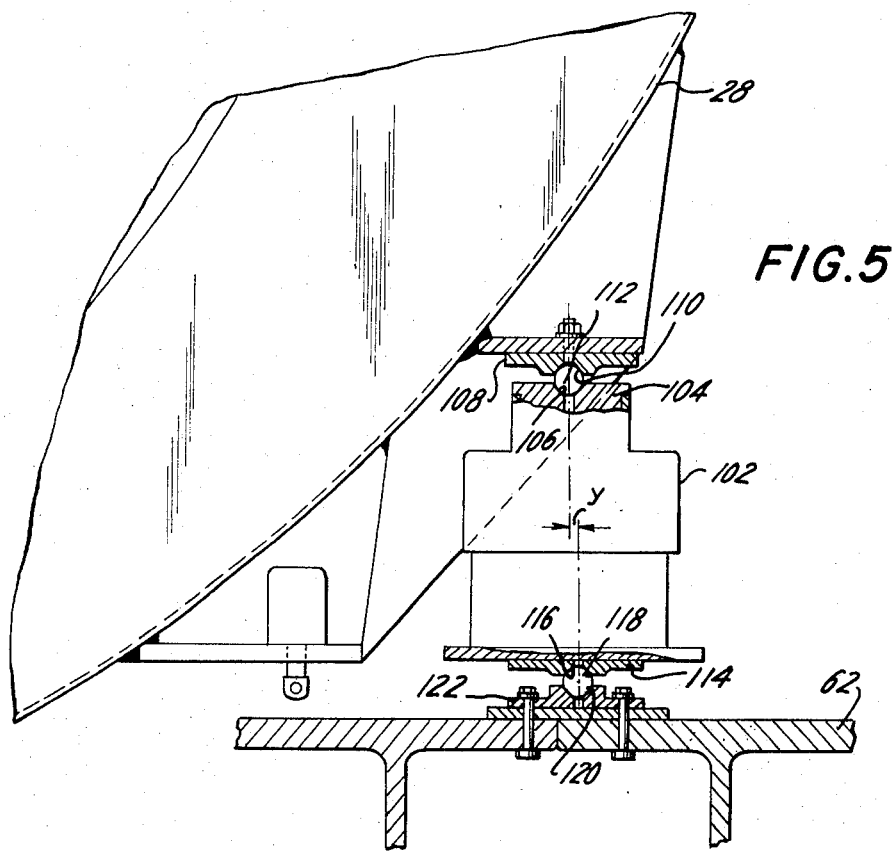
FIG. 5 is a detailed view of one of the exhaust duct mounting springs.

As seen in FIG. 5 in order to accommodate this tilting movement of the springs 100, each spring 100 is contained in a telescopic housing 102, the upper end of which has a plate 104 with a conical recess 106, and a plate 108 secured to the exhaust volute 28 of the exhaust duct 26 has a complimentary conical recess 110, and a spherical ball 112 is disposed between these conical recesses. The bottom end of the spring housing has a similar plate 114 with a conical recess 116 and a spherical ball 118 is disposed between this latter recess and a complimentary conical recess 120 formed in a plate 122 supported on the support base 62. With this arrangement the axis of each spring 100 readily tilts as the exhaust duct 26 expands and contracts.

With this support for the exhaust duct 26, the springs 100 support the weight of the exhaust duct and its exhaust volute 28 and chimney 30, including insulation (not shown) packed about the exhaust duct as well as the gas loads on the duct whereby the exhaust duct exerts only a vertical shear load on the mounting flange 70. This construction thereby minimizes bending stresses of said mounting flange.

While we have described our invention in detail in its present preferred embodiment, it will be obvious to those skilled in the art, after understanding our invention, that various changes and modifications may be made therein without departing from the spirit or scope thereof. We aim, in the appended claims, to cover all such modifications.

What is claimed is:

1. A mounting system for supporting a gas turbine power unit on a base structure in which the gas turbine unit includes an annular stator housing comprising an inlet duct for supplying hot gases thereto, a stator vane assembly axially connected to and extending downstream from said inlet duct and having stator vanes extending radially across the flow path of said gases, and an exhaust duct axially connected to and extending downstream from said stator vane assembly and having an annular exhaust outlet volute and also including a rotor having blades disposed adjacent to said stator vanes and extending radially outwardly in close clearance relation with said stator vane assembly, said mounting system comprising:
   a. flexible duct-like means at the upstream end of the inlet duct for flexibly connecting the inlet duct of the power unit to a source of hot gases,
   b. an annular mounting ring adapted for support from said base structure and surrounding the stator housing intermediate its ends and having a mounting flange with radially inwardly facing splines,
   c. an annular mounting flange secured to said stator vane assembly of the stator housing and having outwardly facing splines in meshing engagement with said mounting flange splines,
   d. the engaging sides of said splines being radial relative to the axis of said power unit, and
   e. a bearing pedestal adapted for support from said base structure and disposed beyond the downstream end of the exhaust duct and having a cantilevered portion extending in an upstream direction through the annular exhaust volute of said exhaust duct to provide a bearing support for the rotor independently of the stator housing and its annular mounting ring.

2. A mounting system as claimed in claim 1 and including a pair of springs disposed on opposite sides of the power unit axis and adjacent to the downstream end of the exhaust duct for resiliently supporting said exhaust duct from said base structure.

3. A mounting system as claimed in claim 2 and in which when the power unit is cold the upper end of each spring connected to the exhaust duct is displaced both in an upstream direction relative to its lower end connected to the common base structure and is also displaced inwardly toward the axis of the power unit relative to its said lower end so that as a result of thermal expansion of the exhaust duct the axis of each spring becomes substantially vertical when the power unit is operating.

4. A mounting system as claimed in claim 1 in which said mounting ring and its flange have a split construction and include a one-piece ring secured to said flange and on which said inwardly facing splines are formed and further in which said stator vane assembly also has a split construction but said annular mounting flange is a one-piece member.

* * * * *